US009264164B2

(12) United States Patent
Wang et al.

(10) Patent No.: US 9,264,164 B2
(45) Date of Patent: *Feb. 16, 2016

(54) TRANSMISSION APPARATUS, TRANSMISSION METHOD, WIRELESS COMMUNICATION SYSTEM FOR ORTHOGONAL COVER CODE (OCC) GENERATION AND OCC MAPPING

(71) Applicant: FUJITSU LIMITED, Kawasaki-shi, Kanagawa (JP)

(72) Inventors: Yi Wang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,533

(22) Filed: Mar. 3, 2015

(65) Prior Publication Data

US 2015/0171982 A1 Jun. 18, 2015

Related U.S. Application Data

(63) Continuation of application No. 13/618,302, filed on Sep. 14, 2012, now Pat. No. 9,001,639, which is a continuation of application No. PCT/CN2010/071532, filed on Apr. 2, 2010.

(51) Int. Cl.
*H04J 11/00* (2006.01)
*H04J 13/18* (2011.01)
(Continued)

(52) U.S. Cl.
CPC ............... *H04J 11/00* (2013.01); *H04J 13/004* (2013.01); *H04J 13/12* (2013.01); *H04J 13/18* (2013.01);
(Continued)

(58) Field of Classification Search
CPC .................................................... H04J 13/004
USPC .......................................................... 370/208
See application file for complete search history.

(56) References Cited

U.S. PATENT DOCUMENTS 6,667,708 B2 12/2003 Schooler et al.
6,671,250 B1 12/2003 Schiff
(Continued)

FOREIGN PATENT DOCUMENTS

CN 1454411 11/2003
CN 101605121 12/2009
(Continued)

OTHER PUBLICATIONS

Office Action issued for corresponding Russian Patent Application No. 2012141308/08, dated Nov. 25, 2013, with an English translation.
Notification of the First Office Action issued for corresponding Chinese Patent Application No. 201080064885.1, issued on Oct. 29, 2013, with an English translation.
(Continued)

*Primary Examiner* — Guang Li
(74) *Attorney, Agent, or Firm* — Myers Wolin, LLC (57) ABSTRACT

A transmission apparatus, a transmission method, a wireless communication system and method. Generate a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$; perform column mirroring on the first group of orthogonal cover code sequences, so as to generate a second group of orthogonal cover code sequences $C_2$; perform cyclic shift processing of column vectors on the first group of orthogonal cover code sequences, so as to generate a third group of orthogonal cover code sequences $C_3$; column mirroring on the third group of orthogonal cover code sequences, so as to generate a fourth group of orthogonal cover code sequences $C_4$; and a transmitter configured to: transmit each of the first group, second group, third group, and fourth group of orthogonal cover code sequences.

16 Claims, 8 Drawing Sheets

(51) Int. Cl.
*H04J 13/00* (2011.01)
*H04J 13/12* (2011.01)
*H04W 72/04* (2009.01)
*H04L 5/00* (2006.01)

(52) U.S. Cl.
CPC ......... *H04W 72/0466* (2013.01); *H04L 5/0007* (2013.01); *H04L 5/0016* (2013.01); *H04L 5/0017* (2013.01)

(56) References Cited

U.S. PATENT DOCUMENTS

| | | | |
|---|---|---|---|
| 2002/0012386 A1 | 1/2002 | Shanbhag | |
| 2002/0021744 A1* | 2/2002 | Iida | H04B 1/707 375/130 |
| 2003/0161286 A1* | 8/2003 | Li | H04J 13/12 370/335 |
| 2006/0050625 A1* | 3/2006 | Krasner | G01S 1/04 370/208 |
| 2009/0046646 A1* | 2/2009 | Cho | H04B 1/7097 370/329 |
| 2009/0100917 A1 | 4/2009 | Ukraintsev | |
| 2009/0209264 A1 | 8/2009 | Yang et al. | |
| 2010/0008333 A1 | 1/2010 | Kim et al. | |
| 2010/0034077 A1 | 2/2010 | Ishii et al. | |
| 2011/0142075 A1* | 6/2011 | Che | H04L 1/1692 370/476 |
| 2012/0176885 A1* | 7/2012 | Lee | H04J 13/0048 370/209 |
| 2012/0287966 A1* | 11/2012 | Wang | H04J 13/004 375/146 |

FOREIGN PATENT DOCUMENTS

| | | |
|---|---|---|
| EP | 1304813 | 4/2003 |
| EP | 2 523 413 A1 | 11/2012 |
| JP | 2003-318704 A | 11/2003 |
| RU | 2 145 152 C1 | 1/2000 |
| RU | 2 260 912 C2 | 9/2005 |
| WO | 2009/011523 A1 | 1/2009 |
| WO | 2009/022293 | 2/2009 |
| WO | 2009/056464 | 5/2009 |

OTHER PUBLICATIONS

The extended European search report, the supplementary European search report and the European search opinion issued for corresponding European Patent Application No. 10848694.5, dated Dec. 18, 2013.
First Office Action issued for corresponding Japanese Patent Application No. 2013-501590, mailed Jan. 28, 2014, with an English translation.
NTT DOCOMO et al., "Length-4 OCC Mapping Scheme for DM-RS Rank 5-8 in LTE-Advanced", Agenda Item: 7.2.1, Feb. 22-26, 2010, R1-101213, 3GPP TSG RAN WG1 Meeting #60, San Francisco, USA.
Huawei, "Remaining issues for DMRS", Agenda Item: 7.2.1, Feb. 22-26, 2010, R1-101056, 3GPP TSG RAN WG1 Meeting #60, San Francisco, USA.
Hanawa et al., "Multi-phase orthogonal code based on Fourier matrix and its application to optical code division multiplexing", Jul. 2009, IEICE Technical Report, IEEE, Yamanashi, Japan, with an English abstract.
Fujitsu, "DM-RS design for Rank 5-8 in LTE-Advanced", Agenda Item: 6.3.1, Apr. 12-16, 2010, R1-102358, 3GPP TSG-RAN1 #60b, Beijing, China.
Fujitsu, "DM-RS OCC design for Rank 5-8 in LTE-Advanced", Agenda Item: 6.3.1.3, May 10-14, 2010, R1-103220, 3GPP TSG-RAN1 #61, Montreal, Canada.
Takeda et al., "Investigation on Multi-layer Reference Signal Using Two-Dimensional Orthogonal Codes in OFDMA Downlink Radio Access for LTE-Advanced", Dec. 2009, IEICE Technical Report, NTT Docomo, Inc., Kanagawa-ken, Japan, with an English abstract.
Office Action issued for corresponding Russian Patent Application No. 2012141308, issued on Apr. 7, 2014, with an English translation.
Notice of Preliminary Rejection issued for corresponding Korean Patent Application No. 10-2012-7025484, mailed on May 7, 2014, with an English translation.
Office Action issued for corresponding Russian Patent Application No. 2012141308, issued on Aug. 27, 2014, with an English translation.
Non-Final Office Action issued by the United States Patent and Trademark Office for corresponding U.S. Appl. No. 13/618,302, electronically delivered on Jul. 30, 2014.

* cited by examiner

TRANSMISSION APPARATUS, TRANSMISSION METHOD, WIRELESS COMMUNICATION SYSTEM FOR ORTHOGONAL COVER CODE (OCC) GENERATION AND OCC MAPPING

The present application is a continuation application of the U.S. patent application Ser. No. 13/618,302, filed Sep. 14, 2012, titled "APPARATUS AND METHOD FOR ORTHOGONAL COVER CODE (OCC) GENERATION, AND APPARATUS AND METHOD FOR OCC MAPPING", now pending, which is a continuation of PCT/CN2010/071532, filed Apr. 2, 2010, the entire contents of each are wholly incorporated by reference.

FIELD OF THE INVENTION

The present invention relates to transmission technology in the wireless communication system, and in particular to an orthogonal cover code generation apparatus and method and an orthogonal cover code mapping apparatus and method in a wireless communication system such as an LTE/LTE-A system.

BACKGROUND OF THE INVENTION

The next-generation wireless communication system LTE-A (Long Term Evolution-Advanced) of 3GPP requires providing a peak rate of 1 Gps and a peak spectrum efficiency of 30 bps/Hz in the downlink. This brings challenge to the transmission scheme in the physical layer of the system. A multi-antenna MIMO (Multiple Input Multiple Output) system is able to support parallel data flow sending thereby greatly increasing the system throughput. Typically, the independent forward error correction encoding is firstly performed on the parallel data flow in the multi-antenna transmission, and then the encoded code words are mapped into the corresponding data transmission layer. In one transmission, the number of all the layers supported by the system is also referred to as a Rank of this transmission. The process of transforming data in each layer into data on each physical antenna is referred to as a pre-encoding process for a signal. LTE-A Rel-10 supports a pre-encoding technology with maximum Rank of 8.

The sending terminal should transmit pilot sequences used for channel estimation, namely demodulation reference signals (DMRSs), for the receiving terminal to perform MIMO decoding and related demodulation. The design of DMRSs should satisfy that DMRSs corresponding to each data transmission layer are mutually orthogonal, i.e. ensure that there is no interference between equivalent channels of pre-encoded channels of respective sending antennas. In a Rel-10 system, DMRSs corresponding to each data transmission layer are distinguished in the manner of frequency division multiplexing (FDM) and/or code division multiplexing (CDM). The code division multiplexing is implemented by spreading sequences whose correlation is ideal with orthogonal cover code sequences. The orthogonal cover code sequences usually employ Walsh Code sequences or Discrete Flourier Transform sequences.

If the orthogonal cover code sequences are mapped in the time domain, i.e. spread in the time domain, it is usually assumed that the channels in the physical resources corresponding to the cover code sequences are identical. Assuming that a spreading factor of a spreading sequence is M, the channel response of the M OFDM symbols are considered to be identical. This assumption is true in the low speed environment. However, with the increasing moving speed of a mobile station, variations of the channel response of the M OFDM symbols increase and the orthogonality of the spreading codes are destroyed, leading to mutual interference between respective data transmission layers and thus reducing the accuracy of the channel estimation.

Moreover, in the Rel-10 system, DMRSs are subjected to the same pre-encoding process as that for data and are mapped onto each sending antenna. The pre-encoding process performs linear superposition on the DMRSs corresponding to each of the code division multiplexed data transmission layers. If the DMRSs corresponding to the M data transmission layers are superposed in the same direction, a signal with amplitude of M is gotten; and if the DMRSs corresponding to the M data transmission layers are superposed in the opposite direction, they are mutually canceled out and a signal with amplitude of 0 is gotten. If such power imbalance of each of the sending antennas occurs in the entire frequency bandwidth, the efficiency of the transmission power may be reduced apparently.

The reference documents of the present invention are listed in the following, which are incorporated herein by reference as if they are described in detail in the present description.

1. [Patent Document 1]: Ishii Hiroyuki, Higuchi Kenichi, Base station apparatus, user apparatus and method used in mobile communication system (US 20100034077 A1);

2. [Patent Document 2]: Hooli Kari, Pajukoski Ka, et al., Method, apparatuses, system and related computer product for resource allocation (WO 2009056464 A1);

3. [Patent Document 3]: Kim Hak Seong, Yun Young Woo, et al., Method of transmitting scheduling reference signal (US 20100008333 A1);

4. [Patent Document 4]: Che Xiangguang, Guo Chunyan, et al., Variable transmission structure for reference signals in uplink messages (WO 2009022293 A2);

5. [Patent Document 5]: Cho Joon-young, Zhang Jianzhong, et al., Apparatus and method for allocating code resource to uplink ACK/NACK channels in a cellular wireless communication system (US 2009046646 A1);

6. [Patent Document 6]: Yang Yunsong, Kwon Younghoon, System and method for adaptively controlling feedback information (US 20090209264 A1); and 7. [Patent Document 7]: Pajukoski Kari P, Tiirola Esa, Providing improved scheduling request signaling with ACK/NACK or CQI (US 20090100917).

SUMMARY OF THE INVENTION

Hereinafter, a brief summarization about the present invention is given, so as to provide basic understanding of some aspects of the present invention. However, it should be understood that this summarization is not an exhaustive summarization about the present invention. It does not intend to be used to either determine a key or important part of the present invention or define the scope of the present invention. Its object is only to give some concepts about the present invention in a simplified form and hereby acts as a preamble of more detailed descriptions which will be presented later.

In view of the above mentioned situation in the prior art, the object of the present invention is to provide an orthogonal cover code generation apparatus and method and an orthogonal cover code mapping apparatus and method, which may solve one or more of the problems in the prior art.

In order to achieve the above mentioned object, according to one aspect of the present invention, there is provided an orthogonal cover code generation apparatus, including: a first orthogonal cover code sequence group generation means for generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$; a second orthogonal cover code sequence group generation means for performing column mirroring on the first group of orthogonal cover code sequences, so as to generate a second group of orthogonal cover code sequences $C_2$; a third orthogonal cover code sequence group generation means for performing cyclic shift processing of column vectors on the first group of orthogonal cover code sequences, so as to generate a third group of orthogonal cover code sequences $C_3$; and a fourth orthogonal cover code sequence group generation means for performing column mirroring on the third group of orthogonal cover code sequences, so as to generate a fourth group of orthogonal cover code sequences $C_4$.

According to another aspect of the present invention, there is further provided an orthogonal cover code mapping apparatus, including: the orthogonal cover code generation apparatus mentioned above for generating multiple groups of orthogonal cover code sequences, wherein the multiple groups of orthogonal cover code sequences comprise at least the first to fourth groups of orthogonal cover code sequences; and a spreading means for spreading pilot sequences with the multiple groups of orthogonal cover code sequences according to a predetermined mapping rule.

According to another aspect of the present invention, there is further provided an orthogonal cover code generation method, including: a first orthogonal cover code sequence group generation step of generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$; a second orthogonal cover code sequence group generation step of performing column mirroring on the first group of orthogonal cover code sequences, so as to generate a second group of orthogonal cover code sequences $C_2$; a third orthogonal cover code sequence group generation step of performing cyclic shift processing of column vectors on the first group of orthogonal cover code sequences, so as to generate a third group of orthogonal cover code sequences $C_3$; and a fourth orthogonal cover code sequence group generation step of performing column mirroring on the third group of orthogonal cover code sequences, so as to generate a fourth group of orthogonal cover code sequences $C_4$.

According to another aspect of the present invention, there is further provided an orthogonal cover code mapping method, including: an orthogonal cover code generation step of generating, according to the orthogonal cover code generation method mentioned above, multiple groups of orthogonal cover code sequences, wherein the multiple groups of orthogonal cover code sequences comprise at least the first to fourth groups of orthogonal cover code sequences; and a spreading step of spreading pilot sequences with the multiple groups of orthogonal cover code sequences according to a predetermined mapping rule.

According to another aspect of the present invention, there is further provided a computer program product for realizing the orthogonal cover code generation method and/or the orthogonal cover code mapping method mentioned above.

According to another aspect of the present invention, there is further provided a computer readable medium with the computer program codes for realizing the orthogonal cover code generation method and/or the orthogonal cover code mapping method mentioned above recorded thereon.

According to another aspect of the present invention, there is further provided a wireless communication system including a transmission apparatus and a reception apparatus, wherein the transmission apparatus includes: a first orthogonal cover code sequence group generation means for generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$; a second orthogonal cover code sequence group generation means for performing column mirroring on the first group of orthogonal cover code sequences, so as to generate a second group of orthogonal cover code sequences $C_2$; a third orthogonal cover code sequence group generation means for performing cyclic shift processing of column vectors on the first group of orthogonal cover code sequences, so as to generate a third group of orthogonal cover code sequences $C_3$; and a fourth orthogonal cover code sequence group generation means for performing column mirroring on the third group of orthogonal cover code sequences, so as to generate a fourth group of orthogonal cover code sequences $C_4$, and wherein the reception apparatus includes a reception means for receiving the spread pilot sequences from the transmission apparatus.

According to another aspect of the present invention, there is further provided a base station including the orthogonal cover code generation apparatus mentioned above.

According to another aspect of the present invention, there is further provided a mobile station including the orthogonal cover code generation apparatus mentioned above.

According to another aspect of the present invention, there is further provided a method in a wireless communication system including a transmission apparatus and a reception apparatus, the method comprising: at the transmitting apparatus, generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$; performing column mirroring on the first group of orthogonal cover code sequences, so as to generate a second group of orthogonal cover code sequences $C_2$; performing cyclic shift processing of column vectors on the first group of orthogonal cover code sequences, so as to generate a third group of orthogonal cover code sequences $C_3$; and performing column mirroring on the third group of orthogonal cover code sequences, so as to generate a fourth group of orthogonal cover code sequences $C_4$, and at the reception apparatus, receiving the spread pilot sequences from the transmission apparatus.

According to the above mentioned technique scheme of the present invention, by performing column mirroring and cyclic shift processing of column vectors on a group of orthogonal cover code sequences, multiple groups of orthogonal cover code sequences are generated to randomize DMRS signals, so as to overcome the problems of imbalanced transmission power due to pre-encoding. Moreover, the orthogonal cover code sequences generated according to the present invention not only ensure orthogonality in one dimension, such as time domain spreading, but also provide orthogonality in time-frequency two-dimensions, thereby reducing the effect of the moving speed of a mobile station on the orthogonality of DMRSs of different data transmission layers and thus to improve the robustness of channel estimation.

BRIEF DESCRIPTION OF THE DRAWINGS

The present invention may be better understood with reference to the detailed description given in conjunction with the accompany drawings as follows. Throughout all the accompany drawings, identical or similar reference numerals are used to represent identical or similar components. The accompany drawings together with the following detailed description are contained in the present specification and form part of the specification, for further illustrating the preferable embodiments of the present invention and explaining the principles and advantages of the present invention by way of example, in which.

The skilled in the art should understand that, the elements in the accompany drawings are only shown for the sake of simplicity and clarity but not necessarily drawn to scale. For example, sizes of some elements in the accompany drawings may be enlarged relative to other elements so as to help to improve the understanding of the embodiments of present invention.

DETAILED DESCRIPTION OF THE INVENTION

Exemplary embodiments of the present invention will be described below in conjunction with the accompanying drawings. For the sake of simplicity and clarity, not all of the features of practical implementations are described in the specification. However, it should be understood that during developing any of such practical implementations, many implementation-specific decisions should be made in order to achieve a specific object of a developer, for example to conform to the limitations relevant to a system or business, and those limitations may vary with different implementations. Moreover, it should also be understood that although the development work may be very complicated and time consuming but may simply be a routine task for those skilled in the art benefiting from this disclosure.

It shall further be noted that only those device structures and/or process steps closely relevant to the solutions of the invention are illustrated in the drawings while other details less relevant to the invention are omitted so as not to obscure the invention due to those unnecessary details.

Referring to the accompany drawings, the orthogonal cover code generation method and orthogonal cover code mapping method according to embodiments of the present invention are to be described in detail as follows.

Figure 1:
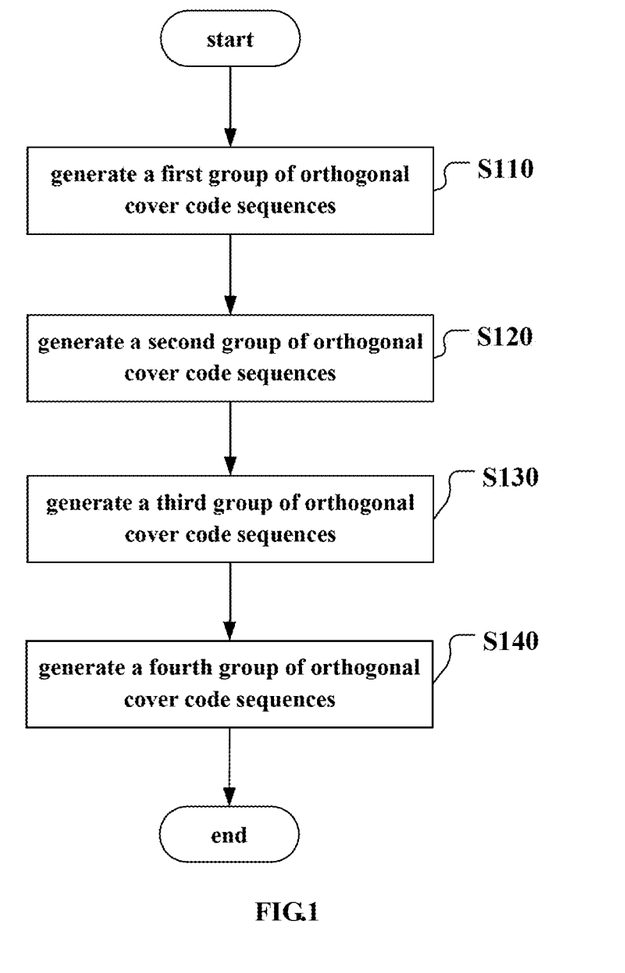
FIG. 1 shows a flow chart of an orthogonal cover code generation method according to an embodiment of the present invention.

FIG. 1 shows a flow chart of an orthogonal cover code generation method according to an embodiment of the present invention.

Firstly, in step S110, a first group of orthogonal cover code sequences $C_1$ is generated. The first group of orthogonal cover code sequences are represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, where n is an index of N orthogonal cover code sequences included in the first group of orthogonal cover code sequences, M is a spreading factor of the orthogonal cover code sequence as a spreading sequence, N≤M, j is an integer satisfying 1≤j≤N/2, and m is an integer satisfying 1≤m≤M/2. Preferably, the first group of orthogonal cover code sequences $C_1$ may be Walsh Code sequences or Flourier Transform sequences.

Next, in step S120, column mirroring is performed on the first group of orthogonal cover code sequences, so as to generate a second group of orthogonal cover code sequences $C_2$.

Next, in step S130, cyclic shift processing of column vectors is performed on the first group of orthogonal cover code sequences, so as to generate a third group of orthogonal cover code sequences $C_3$.

Finally, in step S140, column mirroring is performed on the third group of orthogonal cover code sequences, so as to generate a fourth group of orthogonal cover code sequences $C_4$.

Preferably, the first to fourth groups of orthogonal cover code sequences are respectively represented by a matrix $C_i=$ $[C_{n,i}(1), C_{n,i}(2), \ldots C_{n,i}(M)]$, where i is an index of each group of orthogonal cover code sequences, the first to fourth groups of orthogonal cover code sequences satisfy that the column vectors of each group of orthogonal cover code sequences have different column numbers in a matrix of each group of orthogonal cover code sequences, and $\tilde{C}_{n,k}^{l} = [C_{n,2k-1}(2l-1), C_{n,2k-1}(2l), C_{n,2k}(2l-1), C_{n,2k}(2l)]$ composed of two adjacent groups of orthogonal cover code sequences $C_{2k-1}$ and $C_{2k}$ satisfy that $\tilde{C}_{n1,k}^{l}$ and $\tilde{C}_{n2,k}^{l}$ are mutually orthogonal, where k=1 or 2, L is an integer satisfying 1≤L≤M/2, n1 is an integer satisfying 1≤n1≤N, n2 is an integer satisfying 1≤n2≤N, and n1≠n2.

Preferably, more groups of orthogonal cover code sequences may be generated according to processes similar to those in the steps S130 and S140 by changing the displacement of the cyclic shift of column vectors.

Figure 2:
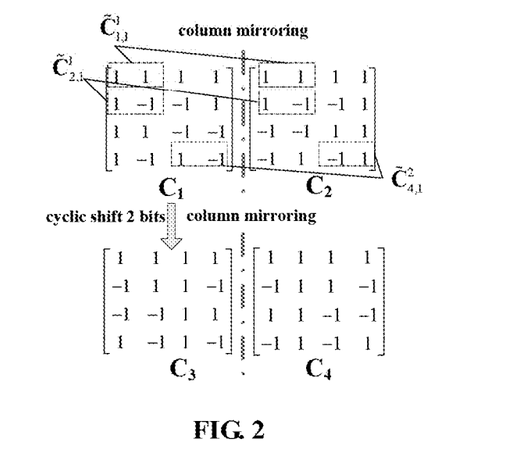
FIG. 2 shows an example diagram of four groups of orthogonal cover code sequences generated according to the present invention.

FIG. 2 shows an example diagram of four groups of orthogonal cover code sequences $C_1$ to $C_4$ generated according to the present invention. In this example, there are totally generated four groups of orthogonal cover code sequences, with each group of orthogonal cover code sequences including four orthogonal sequences and the length of each orthogonal sequence being four. In this example, the generated orthogonal cover code sequences are Walsh sequences and the displacement of the cyclic shift processing of column vectors p=2.

Figure 3:
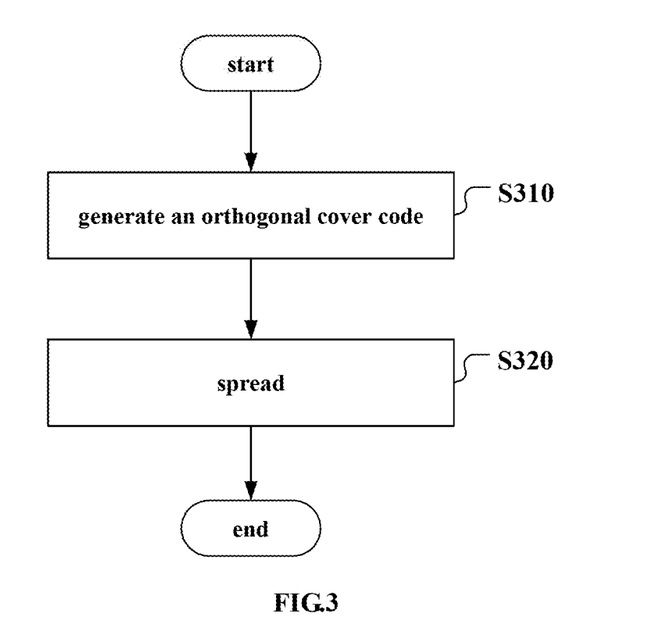
FIG. 3 shows a flow chart of an orthogonal cover code mapping method according to an embodiment of the present invention.

FIG. 3 shows a flow chart of an orthogonal cover code mapping method according to an embodiment of the present invention.

Firstly, in step S310, multiple groups of orthogonal cover code sequences are generated according to the orthogonal cover code generation method shown in FIG. 1, where the multiple groups of orthogonal cover code sequences include at least the first to fourth groups of orthogonal cover code sequences.

Finally, in step S320, pilot sequences are spread with the multiple groups of orthogonal cover code sequences according to a predetermined mapping rule.

Preferably, in the spreading step, the orthogonal cover code sequences are subjected to mapping processing in one or both of time and frequency domains.

Preferably, the mapping rule is intended to reduce a variation range of transmission power of the pilot sequences, or guarantee orthogonality of the pilot sequences in specific time-frequency two-dimensional resources.

Preferably, in the spreading step, the multiple groups of orthogonal cover code sequences are made to be alternately present in the time-frequency resources corresponding to the pilot sequences of Frequency Division Multiplexing and/or Code Division Multiplexing in turn.

Preferably, in the spreading step, the multiple groups of orthogonal cover code sequences are made to be alternately present in the time-frequency resources corresponding to the pilot sequences of Frequency Division Multiplexing and/or Code Division Multiplexing in turn in one of the following orders: $(C_1, C_2, \ldots, C_{K-1}, C_K), (C_2, C_3, \ldots, C_K, C_1), \ldots (C_K, C_1, \ldots, C_{K-2}, C_{K-1}), (C_K, C_{K-1}, \ldots, C_2, C_1), (C_{K-1}, C_{K-2}, \ldots, C_1, C_K), \ldots, (C_1, C_K, \ldots, C_3, C_2)$, where K is the number of the multiple groups of orthogonal cover code sequences.

Preferably, in the spreading step, a mapping order of the multiple groups of orthogonal cover code sequences in a first group of frequency domain resources of Code Division Multiplexing is made to be different from that in a second group of frequency domain resources of Code Division Multiplexing.

Preferably, in the spreading step, the multiple groups of orthogonal cover code sequences are made to be alternately present in the adjacent first and second groups of frequency domain resources of Code Division Multiplexing in turn.

Preferably, in the spreading step, Demodulation Reference Signals (DMRSs) of different data transmission layers of Code Division Multiplexing corresponding to two and four pilot symbols in the time domain are made to be mutually orthogonal, and the DMRSs of different data transmission layers of Code Division Multiplexing corresponding to four sub-carriers in the frequency domain are also made to be mutually orthogonal. Further preferably, in the spreading step, the DMRSs of different data transmission layers of Code Division Multiplexing corresponding to two adjacent pilot symbols in the time domain and two adjacent sub-carriers in the frequency domain are made to be mutually orthogonal.

Preferably, in the spreading step, each physical resource block is made to contain at least the multiple groups of orthogonal cover code sequences.

The orthogonal cover code mapping method according to the embodiment of the present invention is to be described in combination with the figures in detail as follows by taking an LTE-A Rel-10 system and 4 groups of orthogonal cover code sequences as an example. However, the skilled in the art should be clear that the present invention is not limited to the example described in the following.

Figure 4:
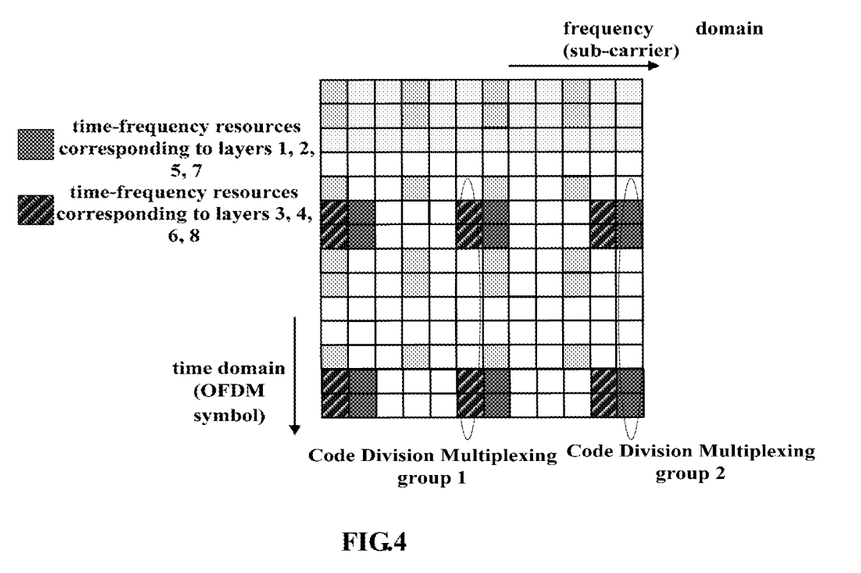
FIG. 4 shows a schematic view of downlink DMRSs in the Rel-10 system.

FIG. 4 shows a schematic view of downlink DMRSs in the Rel-10 system. If the data flow is 1 or 2, in each sub-frame of the LTE-A system, the pilot occupies 12 sub-carriers (Resource Element, RE) in the physical resource blocks (PRBs) of the sixth and seventh OFDM symbols and the thirteenth and fourteenth OFDM symbols. The pilots of the first layer and the second layer occupy the same PRB and they are distinguished by an orthogonal cover code of a length of 2. If the data flow is >2, the DMRSs occupy extra 12 REs for transmitting the DMRSs of the third layer and the fourth layer. The pilots of the third layer and the fourth layer occupy the same PRB and they are distinguished by an orthogonal cover code of a length of 2. If the data flow is >4, the number of the REs occupied by the DMRSs dose not change and is still 24. Each data flow may be distinguished in the manner of the code division multiplexing (CDM) and/or the frequency division multiplexing (FDM). One of the feasible multiplexing manners is shown in FIG. 4. The first, second, fifth and seventh layers are multiplexed in the manner of CDM and are distinguished by an orthogonal cover code of a length of 4. The time-frequency resources occupied are represented by the dark grids in the figure, which are referred to as CDM group 1 for short. The third, fourth, sixth and eighth layers are multiplexed in the manner of CDM and are distinguished by an orthogonal cover code of a length of 4. The time-frequency resources occupied are represented by the grids with twills in the figure, which are referred to as CDM group 2 for short. Moreover, the first, second, fifth and seventh layers and the third, fourth, sixth and eighth layers are multiplexed in the manner of FDM.

Figure 5:
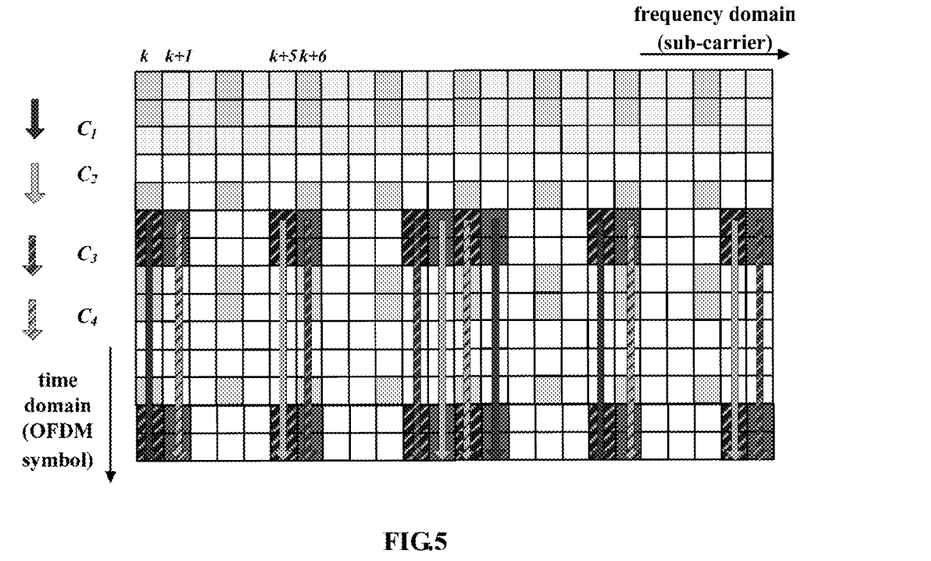
FIG. 5 shows a schematic view of mapping the four groups of orthogonal cover code sequences generated according to the present invention into the downlink DMRS resources in the Rel-10 system.

FIG. 5 shows a schematic view of mapping the four groups of orthogonal cover code sequences generated according to the present invention into the downlink DMRS resources in the Rel-10 system. It can be seen from the figure that the orthogonal cover code sequences are spread in the time domain. That is to say, the DMRSs corresponding to the same sub-carrier on the sixth, seventh, thirteenth and fourteenth OFDM symbols form a spreading code of a length of 4. For the time-frequency resource corresponding to CDM group 1, the generated four groups of orthogonal cover code sequences are mapped sequentially in turn in the order of $C_1, C_2, C_3$ and $C_4$, so as to guarantee that all the orthogonal cover code sequences are included as much as possible in the entire frequency band corresponding to CDM group 1. For the time-frequency resource corresponding to CDM group 2, the generated four groups of orthogonal cover code sequences are mapped sequentially in turn in the order of $C_4$, $C_3$, $C_2$ and $C_1$, so as to guarantee that all the orthogonal cover code sequences are included as much as possible in the entire frequency band corresponding to CDM group 2. The corresponding DMRS resources in each PRB, including CDM group 1 and CDM group 2, all in turn include all the four groups of orthogonal cover code sequences. For example, in the first PRB, all the four groups of orthogonal cover code sequences are included in the (k)th, (k+1)th, (k+5)th and (k+6)th sub-carriers. Therefore, the effect of randomizing pilot sequences is achieved and the peak power of the sending signal is effectively reduced.

Figure 6:
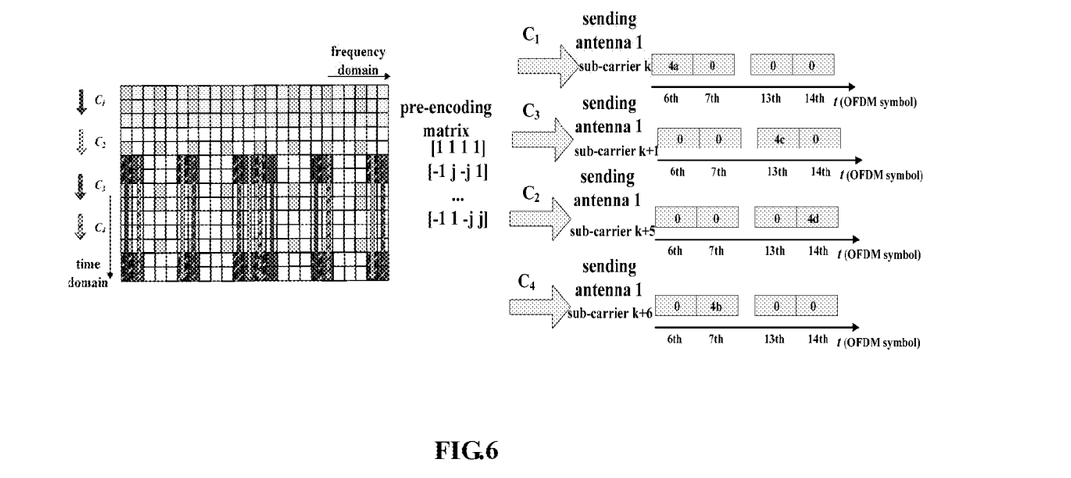
FIG. 6 shows a schematic view of power distribution of mapping the pre-encoded four groups of orthogonal cover code sequences generated according to the present invention onto a first sending antenna.

FIG. 6 shows a schematic view of power distribution of mapping the pre-encoded four groups of orthogonal cover code sequences generated according to the present invention onto a first sending antenna. It can be seen from the figure that if all the row vectors in the pre-encoding matrix are 1, after the column vectors matrixes of the 4 groups of orthogonal cover code sequences $C_1 \sim C_4$ are respectively multiplied by the row vectors of the pre-encoding matrix and the products are respectively added, on the (k)th sub-carrier, corresponding DMRSs of the first, second, eighth and ninth OFDM symbols are respectively 4, 0, 0 and 0; on the (k+1)th sub-carrier, corresponding DMRSs of the first, second, eighth and ninth OFDM symbols are respectively 0, 0, 4 and 0; on the (k+5)th sub-carrier, corresponding DMRSs of the first, second, eighth and ninth OFDM symbols are respectively 0, 0, 0 and 4; and on the (k+6)th sub-carrier, corresponding DMRSs of the first, second, eighth and ninth OFDM symbols are respectively 0, 4, 0 and 0. It is not difficult to see that the power of the DMRSs is uniformly distributed on the four OFDM symbols, so as to avoid the problem of imbalanced power.

Figure 7:
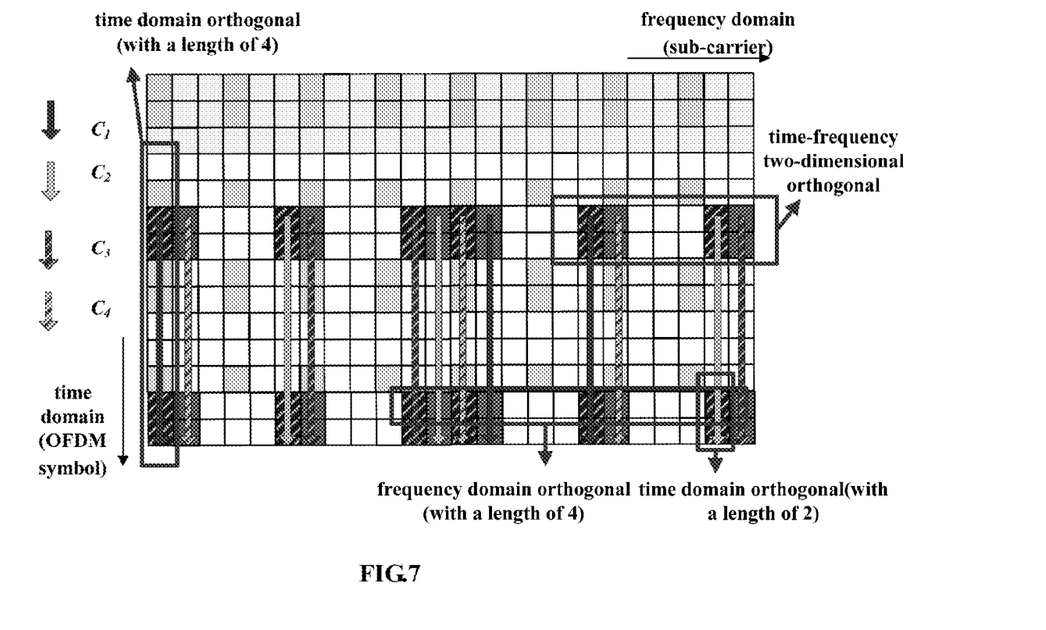
FIG. 7 shows a schematic view of the orthogonality in time-frequency two-dimensions satisfied when the four groups of orthogonal cover code sequences generated according to the present invention are mapped into the downlink DMRSs in the Rel-10 system.

FIG. 7 shows a schematic view of the orthogonality in time-frequency two-dimensions according to the mapping method of the present invention. The orthogonal cover code sequences are spread in the time domain, and the four pilot symbols in each sub-frame respectively correspond to four column vectors of the generated orthogonal cover code sequences. If the length of spreading is 2, the orthogonal cover code sequences mapped in this way also guarantee that the sequences corresponding to two pilot symbols in each sub-frame are orthogonal. Moreover, the sequences corresponding to adjacent four sub-carriers in each pilot symbol also satisfy the orthogonality of a length of 4 in the frequency domain. Furthermore, on two adjacent sub-carriers within a same CDM group, the corresponding DMRSs of adjacent two OFDM symbols also form a spreading code of a length of 4, i.e. the orthogonality is provided in the time-frequency two dimensions. For example, for CDM group 1, on the (k+1)th and (k+6)th sub-carriers, corresponding DMRSs of the first and second OFDM symbols also form mutually orthogonal spreading codes of a length of 4.

Although, in the above, the orthogonal cover code generation method and orthogonal cover code mapping method according to embodiments of the present invention are described in detail in conjunction with the accompanying drawings, the skilled in the art should understand that the flow charts shown in FIGS. 1 and 3 are only exemplary, and the flow of the methods shown in FIGS. 1 and 3 may be correspondingly modified according to practical applications and specific requirements. For example, the performing order of some steps in the methods shown in FIGS. 1 and 3 may be adjusted or some processing steps may be omitted or added as required.

The orthogonal cover code generation apparatus and orthogonal cover code mapping apparatus according to embodiments of the present invention are to be described in conjunction with the accompanying drawings as follows.

Figure 8:
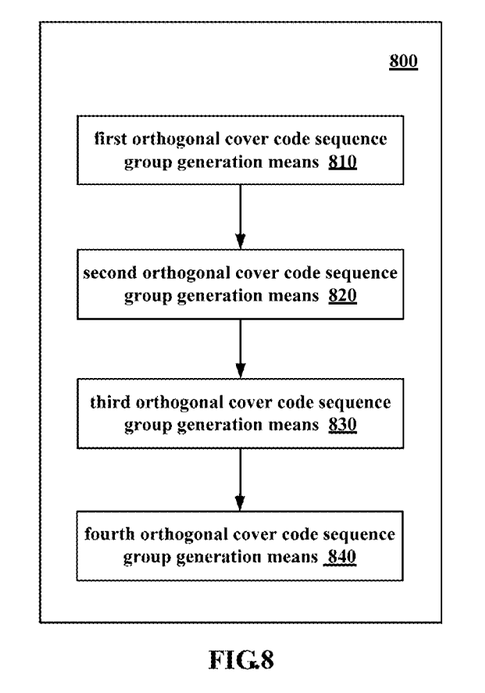
FIG. 8 shows a structural block diagram of an orthogonal cover code generation apparatus according to an embodiment of the present invention.

FIG. 8 shows a structural block diagram of an orthogonal cover code generation apparatus 800 according to an embodiment of the present invention, where only the parts that are closely associated with the present invention are shown for the sake of simplicity and clarity. In the orthogonal cover code generation apparatus 800, the orthogonal cover code generation method described above with reference to FIG. 1 can be performed.

As shown in FIG. 8, the orthogonal cover code generation apparatus 800 may include a first orthogonal cover code sequence group generation means 810, a second orthogonal cover code sequence group generation means 820, a third orthogonal cover code sequence group generation means 830 and a fourth orthogonal cover code sequence group generation means 840.

In the orthogonal cover code generation apparatus 800, the first orthogonal cover code sequence group generation means 810 may be used for generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, where n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$.

The second orthogonal cover code sequence group generation means 820 may be used for performing column mirroring on the first group of orthogonal cover code sequences, so as to generate a second group of orthogonal cover code sequences $C_2$.

The third orthogonal cover code sequence group generation means 830 may be used for performing cyclic shift processing of column vectors on the first group of orthogonal cover code sequences, so as to generate a third group of orthogonal cover code sequences $C_3$.

The fourth orthogonal cover code sequence group generation means 840 may be used for performing column mirroring on the third group of orthogonal cover code sequences, so as to generate a fourth group of orthogonal cover code sequences $C_4$.

Since the specific and/or optional processing procedures of each component of the orthogonal cover code generation apparatus 800 are described in the above with reference to the flow chart of the method, the operation and the processing procedures of these components will not be described in detail any more to avoid repetition.

It should be illustrated that the structure of the orthogonal cover code generation apparatus 800 shown in FIG. 8 is only exemplary, and the skilled in the art may modify the structural block diagram shown in FIG. 8 as required.

Figure 9:
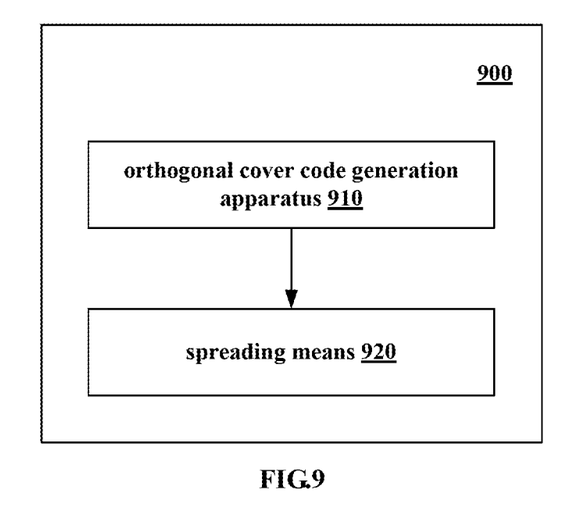
FIG. 9 shows a structural block diagram of an orthogonal cover code mapping apparatus according to an embodiment of the present invention.

FIG. 9 shows a structural block diagram of an orthogonal cover code mapping apparatus 900 according to an embodiment of the present invention, where only the parts that are closely associated with the present invention are shown for the sake of simplicity and clarity. In the orthogonal cover code mapping apparatus 900, the orthogonal cover code mapping method described above with reference to FIG. 3 can be performed.

As shown in FIG. 9, the orthogonal cover code mapping apparatus 900 may include an orthogonal cover code generation apparatus 910 and a spreading apparatus 920.

In the orthogonal cover code mapping apparatus 900, the orthogonal cover code generation apparatus 910 may be composed of an orthogonal cover code generation apparatus as shown in FIG. 8 for generating multiple groups of orthogonal cover code sequences, where the multiple groups of orthogonal cover code sequences include at least the first to fourth groups of orthogonal cover code sequences.

The spreading means 920 may be used for spreading pilot sequences with the multiple groups of orthogonal cover code sequences according to a predetermined mapping rule.

Since the specific and/or optional processing procedures of each component of the orthogonal cover code mapping apparatus 900 are described in the above with reference to the flow chart of the method, the operation and the processing procedures of these components will not be described in detail any more to avoid repetition.

It should be illustrated that the structure of the orthogonal cover code mapping apparatus 900 shown in FIG. 9 is only exemplary, and the skilled in the art may modify the structural block diagram shown in FIG. 9 as required.

Figure 10:
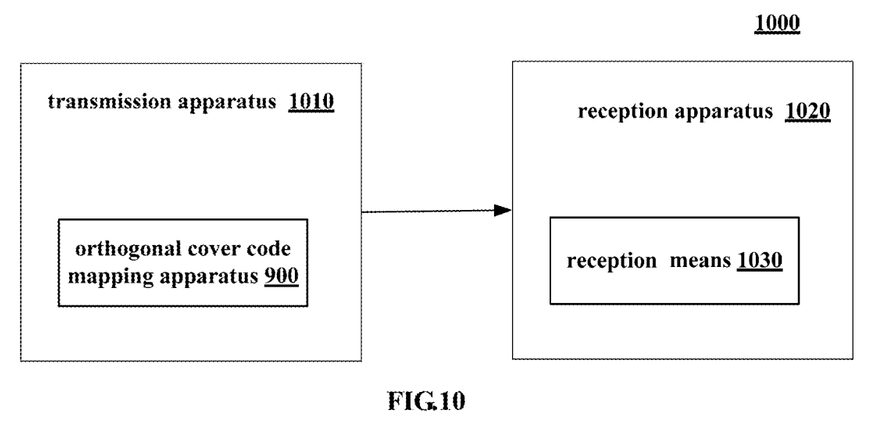
FIG. 10 shows a structural block diagram of a wireless communication system according to an embodiment of the present invention.

FIG. 10 shows a structural block diagram of a wireless communication system 1000 according to an embodiment of the present invention. As shown in FIG. 10, the wireless communication system 1000 may include a transmission apparatus 1010 and a reception apparatus 1020, where the transmission apparatus 1010 may include the above mentioned orthogonal cover code mapping apparatus 900 and the reception apparatus 1020 may include a reception means 1030 for receiving the spread pilot sequences from the transmission apparatus 1010.

Figure 11:
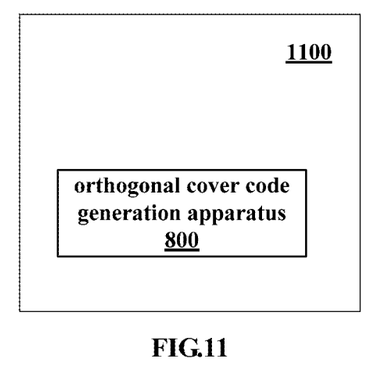
FIG. 11 shows a structural block diagram of a base station according to an embodiment of the present invention.

FIG. 11 shows a structural block diagram of a base station 1100 according to an embodiment of the present invention. As shown in FIG. 11, the base station 1100 may include the above mentioned orthogonal cover code generation apparatus 800.

Figure 12:
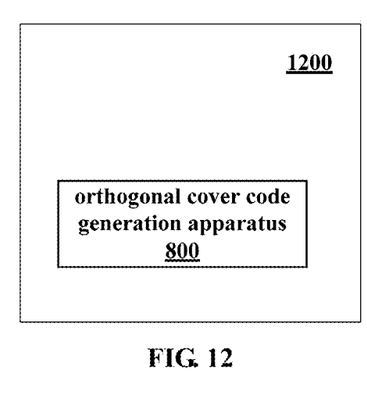
FIG. 12 shows a structural block diagram of a mobile station according to an embodiment of the present invention.

FIG. 12 shows a structural block diagram of a mobile station 1200 according to an embodiment of the present invention. As shown in FIG. 12, the mobile station 1200 may include the above mentioned orthogonal cover code generation apparatus 800.

It is obvious that each operation procedure of the above mentioned methods according to the present invention may be performed in the manner of a computer executable program stored in a machine-readable storage medium.

Moreover, the object of the present invention may also be achieved in the following manner, i.e. a storage medium which has the above mentioned executable program code stored therein is directly or indirectly provided to a system or device, and a computer or a central processing unit (CPU) in the system or device reads out and executes the above mentioned program code. In this case, the implementation of the present invention is not limited to a program and the program may be in any form such as an object program, a program executed by an interpreter or a script program provided to an operating system or the like, as long as the system or device has the function to execute the program.

These machine-readable storage media mentioned above include but not limited to various memories and storage units, semiconductor devices, disk units such as optical disks, magnetic disks and magneto-optical disks, other media suitable to store information and so on.

Moreover, the present invention may also be achieved in the following manner, i.e. a computer is connected to a corresponding website on the internet and computer program codes according to the present invention are downloaded and installed in the computer and are executed therein.

It is obvious that each of the components or steps in the devices and methods of the present invention may be decomposed and/or may be recombined. These decompositions and/or re-combinations should be regarded as equivalent schemes of the present invention. Moreover, the steps carrying out the series of processes mentioned above may be naturally performed chronically in an order of description but not necessarily. Some of the steps may be carried out in parallel or independently from each other.

Although the embodiments of the present invention are described in detail in conjunction with the accompanying drawings, it should be appreciated that the above mentioned embodiments are only for illustration of the present invention and do not limit the present invention. For the skilled in the art, various modifications and alternations may be made to the above mentioned implementations without departing the essential and scope of the present invention. Therefore, the scope of the present invention is only defined by the appended claims and their equivalent meanings.

Although illustrative embodiments have been described herein, it should be understood that various other changes, replacements and modifications may be affected therein by one skilled in the art without departing from the scope or spirit of the invention. Furthermore, the terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

According to various embodiments, the present disclosure provides the following solutions:

1. An orthogonal cover code generation apparatus, comprising:

a first orthogonal cover code sequence group generation means for generating a first group of orthogonal cover code sequences $C_1$ represented by a matrix of $[C_{n,\ 1}(1), C_{n,\ 1}(2), \ldots C_{n,\ 1}(M)]$, which satisfy that any adjacent truncated sub cover code sequences $[C_{2j-1,\ 1}(2m-1), C_{2j-1,\ 1}(2m)]$ and $[C_{2j,\ 1}(2m-1), C_{2j,\ 1}(2m)]$ are also mutually orthogonal, wherein n is an index of N orthogonal cover code sequences included in the first group of orthogonal cover code sequences, M is a spreading factor of the orthogonal cover code sequence as a spreading sequence, N≤M, j is an integer satisfying 1≤j≤N/2, and m is an integer satisfying 1≤m≤M/2;

a second orthogonal cover code sequence group generation means for performing column mirroring on the first group of orthogonal cover code sequences, so as to generate a second group of orthogonal cover code sequences $C_2$;

a third orthogonal cover code sequence group generation means for performing cyclic shift processing of column vectors on the first group of orthogonal cover code sequences, so as to generate a third group of orthogonal cover code sequences $C_3$; and a fourth orthogonal cover code sequence group generation means for performing column mirroring on the third group of orthogonal cover code sequences, so as to generate a fourth group of orthogonal cover code sequences $C_4$.

2. The orthogonal cover code generation apparatus according to solution 1, wherein the first group of orthogonal cover code sequences are Walsh Code sequences or Flourier Transform sequences.

3. The orthogonal cover code generation apparatus according to solution 1, wherein the first to fourth groups of orthogonal cover code sequences are respectively represented by $C_i=[C_{n,i}(1), C_{n,i}(2), \ldots C_{n,i}(M)]$, wherein i is an index of each group of orthogonal cover code sequences, the first to fourth groups of orthogonal cover code sequences satisfy that the column vectors of each group of orthogonal cover code sequences have different column numbers in a matrix of each group of orthogonal cover code sequences, and $\tilde{C}_{n,k}^l = [C_{n,2k-1}(2l-1), C_{n,2k-1}(2l), C_{n,2k}(2l-1), C_{n,2k}(2l)]$ composed of two adjacent groups of orthogonal cover code sequences $C_{2k-1}$ and $C_{2k}$ satisfy that $\tilde{C}_{n1,k}^l$ and $\tilde{C}_{n2,k}^l$ are mutually orthogonal, wherein k=1 or 2, L is an integer satisfying $1 \le L \le M/2$, n1 is an integer satisfying $1 \le n1 \le N$, n2 is an integer satisfying $1 \le n2 \le N$, and $n1 \ne n2$.

4. An orthogonal cover code mapping apparatus, comprising:
the orthogonal cover code generation apparatus according to solution 1 for generating multiple groups of orthogonal cover code sequences, wherein the multiple groups of orthogonal cover code sequences comprise at least the first to fourth groups of orthogonal cover code sequences; and
a spreading means for spreading pilot sequences with the multiple groups of orthogonal cover code sequences according to a predetermined mapping rule.

5. The orthogonal cover code mapping apparatus according to solution 4, wherein the spreading means performs mapping on the orthogonal cover code sequences in one or both of time and frequency domains.

6. The orthogonal cover code mapping apparatus according to solution 5, wherein the mapping rule is intended to reduce a variation range of transmission power of the pilot sequences, or guarantee orthogonality of the pilot sequences in specific time-frequency two-dimensional resources.

7. The orthogonal cover code mapping apparatus according to solution 5, wherein the spreading means makes the multiple groups of orthogonal cover code sequences alternately present in the time-frequency resources corresponding to the pilot sequences of Frequency Division Multiplexing and/or Code Division Multiplexing in turn.

8. The orthogonal cover code mapping apparatus according to solution 7, wherein the spreading means makes the multiple groups of orthogonal cover code sequences alternately present in the time-frequency resources corresponding to the pilot sequences of Frequency Division Multiplexing and/or Code Division Multiplexing in turn in one of the following orders: $(C_1, C_2, \ldots, C_{K-1}, C_K)$, $(C_2, C_3, \ldots, C_K, C_1), \ldots (C_K, C_1, \ldots, C_{K-2}, C_{K-1})$; $(C_K, C_{K-1}, \ldots, C_2, C_1), (C_{K-1}, C_{K-2}, \ldots, C_1, C_K), \ldots, (C_1, C_K, \ldots, C_3, C_2)$, wherein K is the number of the multiple groups of orthogonal cover code sequences.

9. The orthogonal cover code mapping apparatus according to solution 7, wherein the spreading means makes a mapping order of the multiple groups of orthogonal cover code sequences in a first group of frequency domain resources of Code Division Multiplexing different from that in a second group of frequency domain resources of Code Division Multiplexing.

10. The orthogonal cover code mapping apparatus according to solution 7, wherein the spreading means makes the multiple groups of orthogonal cover code sequences alternately present in the adjacent first and second groups of frequency domain resources of Code Division Multiplexing in turn.

11. The orthogonal cover code mapping apparatus according to solution 7, wherein the spreading means makes Demodulation Reference Signals (DMRSs) of different data transmission layers of Code Division Multiplexing corresponding to two and four pilot symbols in the time domain mutually orthogonal, and also makes the DMRSs of different data transmission layers of Code Division Multiplexing corresponding to four sub-carriers in the frequency domain mutually orthogonal.

12. The orthogonal cover code mapping apparatus according to solution 11, wherein the spreading means makes the DMRSs of different data transmission layers of Code Division Multiplexing corresponding to two adjacent pilot symbols in the time domain and two adjacent sub-carriers in the frequency domain mutually orthogonal.

13. The orthogonal cover code mapping apparatus according to solution 6, wherein the spreading means makes each physical resource block contain at least the multiple groups of orthogonal cover code sequences.

14. An orthogonal cover code generation method, comprising:
a first orthogonal cover code sequence group generation step of generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \le M$, j is an integer satisfying $1 \le j \le N/2$, and m is an integer satisfying $1 \le m \le M/2$;
a second orthogonal cover code sequence group generation step of performing column mirroring on the first group of orthogonal cover code sequences, so as to generate a second group of orthogonal cover code sequences $C_2$;
a third orthogonal cover code sequence group generation step of performing cyclic shift processing of column vectors on the first group of orthogonal cover code sequences, so as to generate a third group of orthogonal cover code sequences $C_3$; and
a fourth orthogonal cover code sequence group generation step of performing column mirroring on the third group of orthogonal cover code sequences, so as to generate a fourth group of orthogonal cover code sequences $C_4$.

15. A wireless communication system comprising:
a transmission apparatus and a reception apparatus,
wherein the transmission apparatus includes:
a first orthogonal cover code sequence group generation means for generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \le M$, j is an integer satisfying $1 \le j \le N/2$, and m is an integer satisfying $1 \le m \le M/2$;

a second orthogonal cover code sequence group generation means for performing column mirroring on the first group of orthogonal cover code sequences, so as to generate a second group of orthogonal cover code sequences $C_2$;

a third orthogonal cover code sequence group generation means for performing cyclic shift processing of column vectors on the first group of orthogonal cover code sequences, so as to generate a third group of orthogonal cover code sequences $C_3$; and a fourth orthogonal cover code sequence group generation means for performing column mirroring on the third group of orthogonal cover code sequences, so as to generate a fourth group of orthogonal cover code sequences $C_4$, and wherein the reception apparatus includes:

a reception means for receiving the spread pilot sequences from the transmission apparatus.

16. A method in a wireless communication system including a transmission apparatus and a reception apparatus, the method comprising:

at the transmission apparatus, generating a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, N≤M, j is an integer satisfying 1≤j≤N/2, and m is an integer satisfying 1≤m≤M/2;

performing column mirroring on the first group of orthogonal cover code sequences, so as to generate a second group of orthogonal cover code sequences $C_2$;

performing cyclic shift processing of column vectors on the first group of orthogonal cover code sequences, so as to generate a third group of orthogonal cover code sequences $C_3$; and performing column mirroring on the third group of orthogonal cover code sequences, so as to generate a fourth group of orthogonal cover code sequences $C_4$, and at the reception apparatus, receiving the spread pilot sequences from the transmission apparatus.

What is claimed is:

1. A transmission apparatus, comprising:

a processor configured to:

generate a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, N≤M, j is an integer satisfying 1≤j≤N/2, and m is an integer satisfying 1≤m≤M/2;

perform column mirroring on the first group of orthogonal cover code sequences, so as to generate a second group of orthogonal cover code sequences $C_2$;

perform cyclic shift processing of column vectors on the first group of orthogonal cover code sequences, so as to generate a third group of orthogonal cover code sequences $C_3$;

column mirroring on the third group of orthogonal cover code sequences, so as to generate a fourth group of orthogonal cover code sequences $C_4$; and a transmitter configured to:

transmit each of the first group, second group, third group, and fourth group of orthogonal cover code sequences.

2. The transmission apparatus according to claim 1, wherein the first group of orthogonal cover code sequences are Walsh Code sequences or Fourier Transform sequences.

3. The transmission apparatus according to claim 1, wherein the first to fourth groups of orthogonal cover code sequences are respectively represented by $C_i=[C_{n,i}(1), C_{n,i}(2), \ldots C_{n,i}(M)]$, wherein i is an index of each group of orthogonal cover code sequences, the first to fourth groups of orthogonal cover code sequences satisfy that the column vectors of each group of orthogonal cover code sequences have different column numbers in a matrix of each group of orthogonal cover code sequences, and $\tilde{C}_{n,k}^l=[C_{n,2k-1}(2l-1), C_{n,2k-1}(2l), C_{n,2k}(2l-1), C_{n,2k}(2l)]$ composed of two adjacent groups of orthogonal cover code sequences $C_{2k-1}$ and $C_{2k}$ satisfy that $\tilde{C}_{n1,k}^l$ and $\tilde{C}_{n2,k}^l$ are mutually orthogonal, wherein k=1 or 2, L is an integer satisfying 1≤L≤M/2, n1 is an integer satisfying 1≤n1≤N, n2 is an integer satisfying 1≤n2≤N, and n1≠n2.

4. The transmission apparatus according to claim 1, wherein the processor is further configured to spread pilot sequences with the multiple groups of orthogonal cover code sequences according to a predetermined mapping rule.

5. The transmission apparatus according to claim 4, wherein the processor performs mapping on the orthogonal cover code sequences in one or both of time and frequency domains.

6. The transmission apparatus according to claim 5, wherein the mapping rule is intended to reduce a variation range of transmission power of the pilot sequences, or guarantee orthogonality of the pilot sequences in specific time-frequency two-dimensional resources.

7. The transmission apparatus according to claim 6, wherein the processor makes each physical resource block contain at least the multiple groups of orthogonal cover code sequences.

8. The transmission apparatus according to claim 5, wherein the processor makes the multiple groups of orthogonal cover code sequences alternately present in the time-frequency resources corresponding to the pilot sequences of Frequency Division Multiplexing and/or Code Division Multiplexing in turn.

9. The transmission apparatus according to claim 8, wherein the processor makes the multiple groups of orthogonal cover code sequences alternately present in the time-frequency resources corresponding to the pilot sequences of Frequency Division Multiplexing and/or Code Division Multiplexing in turn in one of the following orders: $(C_1, C_2, \ldots, C_{K-1}, C_K), (C_2, C_3, \ldots, C_K, C_1), \ldots (C_K, C_1, \ldots, C_{K-2}, C_{K-1}), (C_K, C_{K-1}, \ldots, C_2, C_1), (C_{K-1}, C_{K-2}, \ldots, C_1, C_K), \ldots, (C_1, C_K, \ldots, C_3, C_2)$, wherein K is the number of the multiple groups of orthogonal cover code sequences.

10. The transmission apparatus according to claim 8, wherein the processor makes a mapping order of the multiple groups of orthogonal cover code sequences in a first group of frequency domain resources of Code Division Multiplexing different from that in a second group of frequency domain resources of Code Division Multiplexing.

11. The transmission apparatus according to claim 8, wherein the processor makes the multiple groups of orthogonal cover code sequences alternately present in the adjacent first and second groups of frequency domain resources of Code Division Multiplexing in turn.

12. The transmission apparatus according to claim 8, wherein the processor makes Demodulation Reference Signals (DMRSs) of different data transmission layers of Code Division Multiplexing corresponding to two and four pilot symbols in the time domain mutually orthogonal, and also makes the DMRSs of different data transmission layers of Code Division Multiplexing corresponding to four sub-carriers in the frequency domain mutually orthogonal.

13. The transmission apparatus according to claim 12, wherein the processor makes the DMRSs of different data transmission layers of Code Division Multiplexing corresponding to two adjacent pilot symbols in the time domain and two adjacent sub-carriers in the frequency domain mutually orthogonal.

14. An transmission method, comprising:
a first orthogonal cover code sequence group generation step of generating, by a processor, a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$;
a second orthogonal cover code sequence group generation step of performing, by the processor, column mirroring on the first group of orthogonal cover code sequences, so as to generate a second group of orthogonal cover code sequences $C_2$;
a third orthogonal cover code sequence group generation step of performing, by the processor, cyclic shift processing of column vectors on the first group of orthogonal cover code sequences, so as to generate a third group of orthogonal cover code sequences $C_3$;
a fourth orthogonal cover code sequence group generation step of performing, by the processor, column mirroring on the third group of orthogonal cover code sequences, so as to generate a fourth group of orthogonal cover code sequences $C_4$; and
a transmit step of transmitting, by a transmitter, each of the first group, second group, third group, and fourth group of orthogonal cover code sequences.

15. A wireless communication system comprising:
a transmission apparatus and a reception apparatus, wherein the transmission apparatus includes:
a processor configured to:
generate a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$;
perform column mirroring on the first group of orthogonal cover code sequences, so as to generate a second group of orthogonal cover code sequences $C_2$; perform cyclic shift processing of column vectors on the first group of orthogonal cover code sequences, so as to generate a third group of orthogonal cover code sequences $C_3$;
perform column mirroring on the third group of orthogonal cover code sequences, so as to generate a fourth group of orthogonal cover code sequences $C_4$; and a transmitter configured to:
transmit each of the first group, second group, third group, and fourth group of orthogonal cover code sequences; and
wherein the reception apparatus includes a processor and a receiver configured to:
receive each of the first group, second group, third group, and fourth group of orthogonal cover code sequences from the transmission apparatus.

16. A method in a wireless communication system including a transmission apparatus and a reception apparatus, the method comprising:
generating, by a processor in the transmission apparatus, a first group of orthogonal cover code sequences $C_1$ represented by a matrix of $[C_{n,1}(1), C_{n,1}(2), \ldots C_{n,1}(M)]$, which satisfy that any adjacent truncated sub cover code sequences $[C_{2j-1,1}(2m-1), C_{2j-1,1}(2m)]$ and $[C_{2j,1}(2m-1), C_{2j,1}(2m)]$ are also mutually orthogonal, wherein n is an index of N orthogonal cover code sequences included in the first group of orthogonal cover code sequences, M is a spreading factor of the orthogonal cover code sequence as a spreading sequence, $N \leq M$, j is an integer satisfying $1 \leq j \leq N/2$, and m is an integer satisfying $1 \leq m \leq M/2$;
performing, by the processor in the transmission apparatus, column mirroring on the first group of orthogonal cover code sequences, so as to generate a second group of orthogonal cover code sequences $C_2$;
performing, by the processor in the transmission apparatus, cyclic shift processing of column vectors on the first group of orthogonal cover code sequences, so as to generate a third group of orthogonal cover code sequences $C_3$; and
performing, by the processor in the transmission apparatus, column mirroring on the third group of orthogonal cover code sequences, so as to generate a fourth group of orthogonal cover code sequences $C_4$;
transmitting, by a transmitter in the transmission apparatus, each of the first, second, third, and fourth orthogonal cover code sequences; and
receiving, by a processor and a receiver in the reception apparatus, each of the first group, second group, third group, and fourth group of orthogonal cover code sequences from the transmission apparatus.

\* \* \* \* \*